United States Patent
Hugh Sam et al.

(10) Patent No.: US 9,531,224 B2
(45) Date of Patent: Dec. 27, 2016

(54) GENERATOR SPRING BAR ENHANCEMENT FOR CORE SUPPORT SYSTEM

(71) Applicants: Paul F. Hugh Sam, Winter Springs, FL (US); Manish P. Dhekane, Orlando, FL (US)

(72) Inventors: Paul F. Hugh Sam, Winter Springs, FL (US); Manish P. Dhekane, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 586 days.

(21) Appl. No.: 14/045,875

(22) Filed: Oct. 4, 2013

(65) Prior Publication Data
US 2015/0097469 A1 Apr. 9, 2015

(51) Int. Cl.
*H02K 1/18* (2006.01)
*H02K 5/24* (2006.01)

(52) U.S. Cl.
CPC ............ *H02K 1/185* (2013.01); *H02K 5/24* (2013.01)

(58) Field of Classification Search
CPC .................................. H02K 1/185; H02K 5/24
USPC ................................ 310/427, 431, 432, 433
IPC ....................................................... H02K 1/18
See application file for complete search history.

(56) References Cited

U.S. PATENT DOCUMENTS

| | | | | |
|---|---|---|---|---|
| 4,425,523 A * | 1/1984 | Detinko | ............... | H02K 1/185 310/216.129 |
| 4,891,540 A * | 1/1990 | Cooper | ............... | H02K 1/185 310/433 |
| 6,144,129 A * | 11/2000 | Fuller | ............... | F16F 1/185 310/171 |
| 6,346,760 B1 * | 2/2002 | Boardman, IV | ....... | H02K 1/185 310/216.007 |
| 6,498,417 B2 | 12/2002 | Fuller | | |
| 6,628,027 B2 * | 9/2003 | Fuller | ............... | H02K 5/24 310/51 |
| 7,045,918 B2 | 5/2006 | Jonson | | |
| 8,040,014 B2 * | 10/2011 | Boardman, IV | ....... | H02K 1/185 310/216.129 |
| 8,319,405 B2 * | 11/2012 | Allen | ............... | H02K 1/185 310/413 |
| 2002/0074894 A1 | 6/2002 | Fuller | | |
| 2010/0295407 A1 * | 11/2010 | Boardman, IV | ....... | H02K 1/185 310/216.113 |

(Continued)

FOREIGN PATENT DOCUMENTS

| | | |
|---|---|---|
| GB | 2392013 A | 2/2004 |
| GB | 2475599 A | 5/2011 |

(Continued)

*Primary Examiner* — John K Kim

(57) ABSTRACT

A generator including a frame (56); first and second frame rings (13) extending radially inwardly from an inside surface of the frame (56); a core (54) within the frame (56); key bars (100) spaced apart circumferentially and extending axially spanning a distance between the first and second frame rings (75A and 75B), the key bars coupled to the core; laminated spring bars (60) spaced apart circumferentially and extending axially to span a distance between the first and second frame rings, a first spring bar end (112) supported by the first frame ring (75A), a second opposing spring bar end (111) supported by the second frame ring (75B), each spring bar coupled to a key bar; wherein the laminated spring bar further includes spring bar subcomponents (60A and 60B) and couplers (98/99) for coupling the spring bar subcomponents.

6 Claims, 2 Drawing Sheets

(56) References Cited

U.S. PATENT DOCUMENTS

| | | | |
|---|---|---|---|
| 2011/0121680 A1* | 5/2011 | Boardman, IV | H02K 1/185 310/216.129 |
| 2011/0266895 A1 | 11/2011 | Ichimonji | |
| 2012/0104760 A1 | 5/2012 | Tanavde | |
| 2015/0097469 A1* | 4/2015 | Hugh Sam | H02K 1/185 310/431 |

FOREIGN PATENT DOCUMENTS

| | | |
|---|---|---|
| GB | 2485053 A | 5/2012 |
| WO | 0057535 A1 | 9/2000 |

* cited by examiner

GENERATOR SPRING BAR ENHANCEMENT FOR CORE SUPPORT SYSTEM

FIELD OF THE INVENTION

The present invention relates to electric power generators and more specifically to an enhanced spring bar core support system, e.g., changing a resonant frequency of the core support system, for a generator.

BACKGROUND OF THE INVENTION

The generator stator core is the largest monobloc component in a turbine-generator set. The stator core comprises thousands of thin steel laminations stacked horizontally and clamped together to form a cylindrical stator core disposed within a generator frame. Each lamination defines a central opening and thus when stacked an axial opening extends through the core. The laminations are held together by a plurality of axial through-bolts that extend from end-to-end through the core.

A rotor is disposed within the central opening and rotated by a rotating turbine. Electrical current is supplied to rotor windings such that rotation generates electric current in stator windings. The stator current is supplied to a plurality of main and neutral electrical leads mounted to the generator frame then to electrical loads through a transmission and distribution system.

Steady-state and transient forces generated during normal operation and transient conditions impose substantial forces on the stator core. These forces can distort the core geometric shape, cause the laminations to vibrate, and damage the core, rotor and/or frame. Also, mechanical fatigue caused by these forces can lead to premature failure of generator components.

Certain of these forces (including especially steady state forces generated during normal generator operation) may excite resonant responses in the generator and in particular in the coupling components that attach the core to the frame. Once the resonant response begins, the magnitude of these forces may increase substantially.

To reduce the effects of the steady sate and transient forces, the generator frame is fixed to a stable support such as the floor of a power plant and the stator core is solidly affixed to the generator frame. According to the prior art different attachment techniques and corresponding attachment components are employed to affix the core to the frame.

Keybars are used in one attachment technique. These long, axially-disposed members are located along an outer circumference of the stator core, specifically within slots defined in the outer circumference. The radially inwardly facing surface of each keybar is held within the slot by a geometrically capturing interfacing shape (for example a dovetail shape). A radially outwardly facing surface of each keybar is attached to the stator frame using various intermediate hardware components.

One such intermediate attachment component comprises a resilient spring bar. Several spring bars are distributed circumferentially around an interior surface of the frame and each spring bar extends axially through the frame. A first surface of each spring bar is attached to radially inwardly facing generator frame ribs and an opposing second surface of each spring bar is attached to a key bar mounting block or plate. The key bar block or plate is attached to the keybar.

The end of each keybar (both the exciter end and the turbine end) comprises a threaded segment for receiving a threaded nut and mating washer. The nuts are tightened to provide a clamping force to the stator core.

FIG. 1 is a partial cutaway perspective view of a prior art electric generator 8 and a stator core 10 mounted within a generator frame that is not shown in FIG. 1. FIG. 1 further illustrates a spring bar 15; a plurality of such spring bars 15 is distributed around a circumference of the core 10. Each frame ring 13 comprises a circumferential component 13A and a transverse component 13B.

A first surface of each spring bar 15 is attached to a plurality of the transverse components 13B by fasteners 19. Each transverse component 13B is welded to a circumferential component 13A and each circumferential component 13A is welded to an inside surface of the generator frame.

Each spring bar 15 extends an axial length of the core 10. At a plurality of axially spaced-apart locations a second surface of each spring bar 15 is attached to a key bracket or key block 20 using fasteners 18. Each key block 20 spans a width of a keybar 22 and a plurality of key blocks 20 are axially distributed along each keybar 22.

The keybars 22 are fixedly captured within the core 10 by a geometrically capturing interface defined in an outer surface of the core 10. The keybars 22 and the core grooves are shaped such that the keybars 22 are captured within the groove by the geometric capture feature, such as the illustrated dovetail shape. A fastener 7 is tightened to provide additional forces to secure the keybar 22 to the core 10. Thus the core 10 is connected to the generator frame by serial coupling of the keybars 22 geometrically retained within core grooves, the key blocks 20 and the spring bars 15.

Stator windings (also referred to as stator bars, but not illustrated) are disposed within winding slots 21. Through-bolts extend axially through openings 23. The through-bolts and mating nuts (neither illustrated in FIG. 1) cooperate to exert inwardly-directed axial clamping forces on core end plates and laminations that comprise the core 10.

BRIEF DESCRIPTION OF THE DRAWINGS

The invention is explained in the following description in view of the drawings that show.

DETAILED DESCRIPTION OF THE INVENTION

This invention relates to a system for attaching a generator core to a generator frame (i.e., a core-to-frame attachment system) that exhibits a natural frequency beyond a range of resonant frequencies that are excited during normal and transient generator operation.

It is known in the art that when a natural frequency of the core-to-frame attachment system is excited, the resulting forces can initiate cracks in the weld joints of this system. These forces can also cause the cracks to propagate from the point of origin, reducing the capability of this system to support the dead weight of the core and the torsional forces developed during operation. The cracks may also induce noise and vibrations within the generator.

As a result of the mechanical and electrical properties of generator components, generators in operation today have one resonant frequency at approximately twice the line frequency. For a 2-pole 3000 RPM generator generating electricity at a line frequency of 50 Hz one resonant frequency is at about 100 Hz and for 2-pole 3600 RPM generator producing electricity at a line frequency of 60 Hz one resonant frequency is about 120 Hz. For a 4-pole generator operating at 1500 RPM and a line frequency of 50 Hz the resonant frequency is also at about 100 Hz and for a 4-pole 1800 RPM generator operating at a 60 Hz line frequency the resonant frequency is also about 120 Hz. Note that both resonant frequencies are at twice the value of the line frequency. Thus these resonant frequencies are easily excited during operation of the generator.

The natural frequency of the core-to-frame attachment system of the present invention is higher than these resonant frequencies and other troublesome resonant frequencies produced during generator operation.

The invention is described for use with a generator core using spring bars to affix the core to the frame. However the principles of the invention can be applied to other dynamoelectric machines by employing similar core-to-frame attachment systems.

Figure 2:
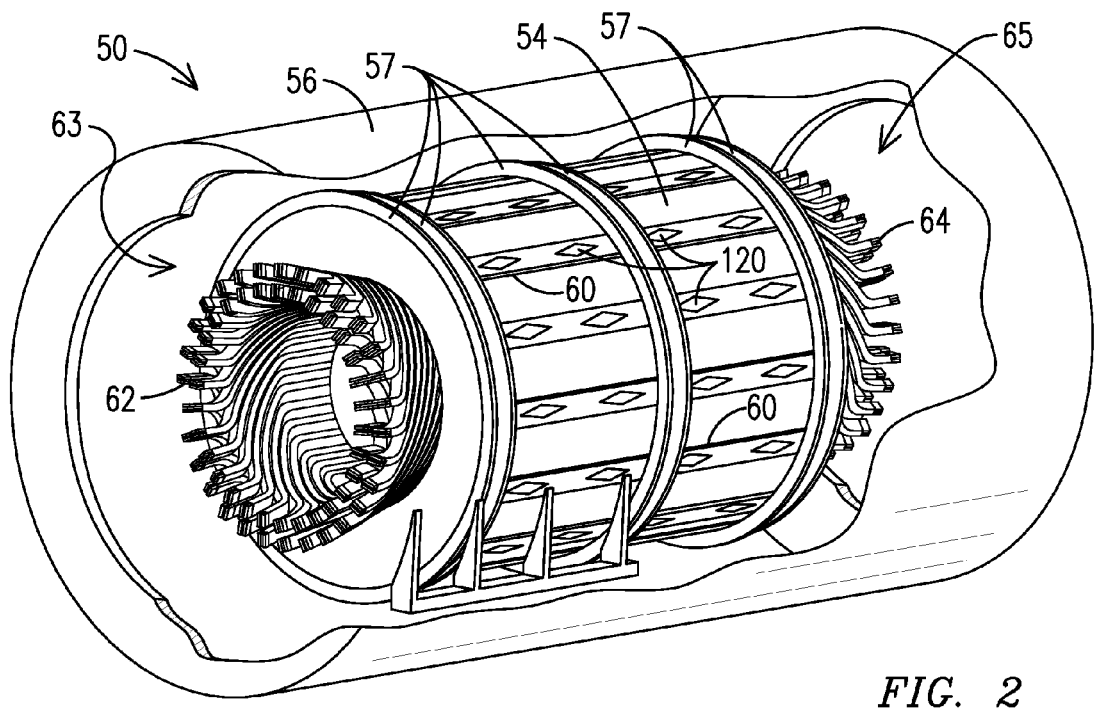
FIG. 2 is a cutaway view of certain components for use in attaching the generator core to the frame according to the present invention.

FIG. 2 is a partial cutaway view illustrating a core 54, a generator frame 56 and three pairs of proximately-disposed U-plates 57. A frame ring (not shown) is captured between each U-plate pair and welded to each of the U-plates 57 to attach the core 54 to the frame 56. FIG. 2 illustrates three pairs of the U-plates 57 each for mating with one of three frame rings. A generator for use with the present invention may have more or fewer than three frame rings depending on frame length and other generator parameters. Further, the frame rings may not be equally spaced along the generator axis.

Figure 1:
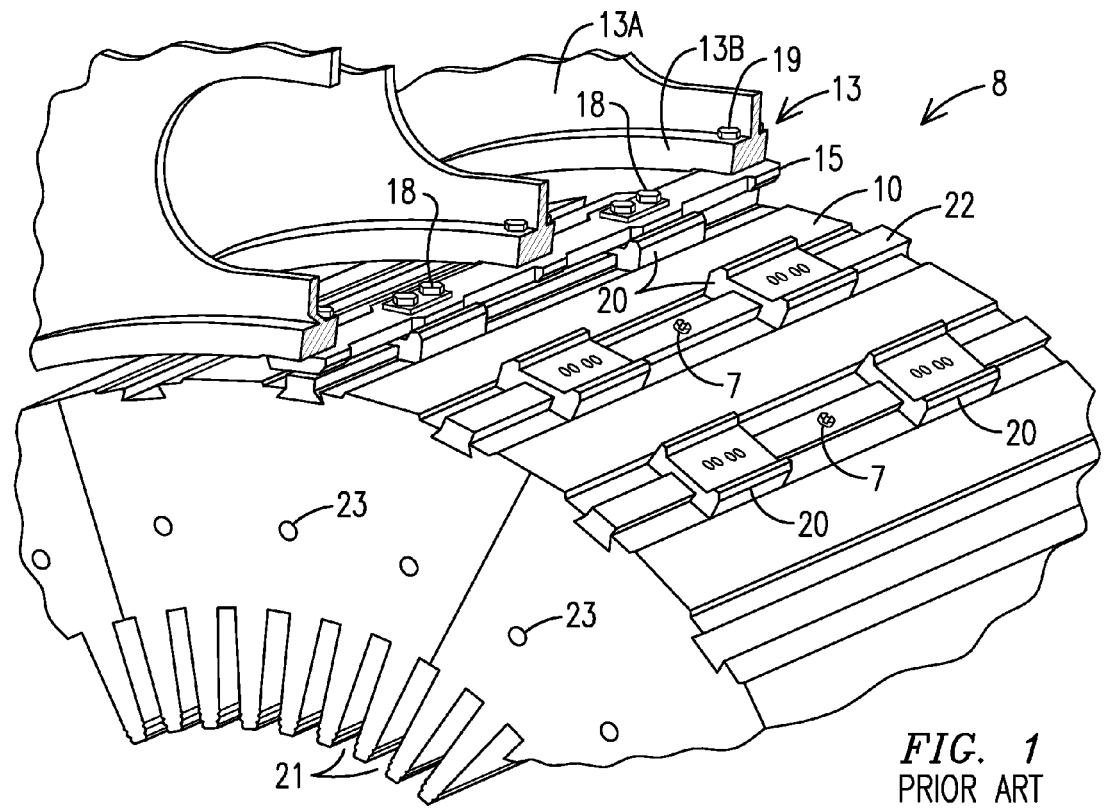
FIG. 1 is a cutaway view of a prior art generator core within a frame.

Note that frame rings employed in the FIG. 2 embodiment are unlike the frame rings 13 in FIG. 1. Instead of comprising a circumferential component 13A and a transverse component 13B as in FIG. 1, the frame rings for use in the FIG. 2 embodiment comprise only the circumferential component that is captured between and welded to each pair of U-plates 57. The frame rings are not shown in FIG. 2.

Continuing with FIG. 2, laminated spring bars 60 cooperate with key bars, key blocks and fasteners (none visible in FIG. 2) to secure the core 54 to the generator frame 56. These components are further illustrated in detail in FIG. 3 and described below.

Stator winding ends 62 at the turbine end 63 and stator winding ends 64 at the exciter end 65 are illustrated in FIG. 2.

Figure 3:
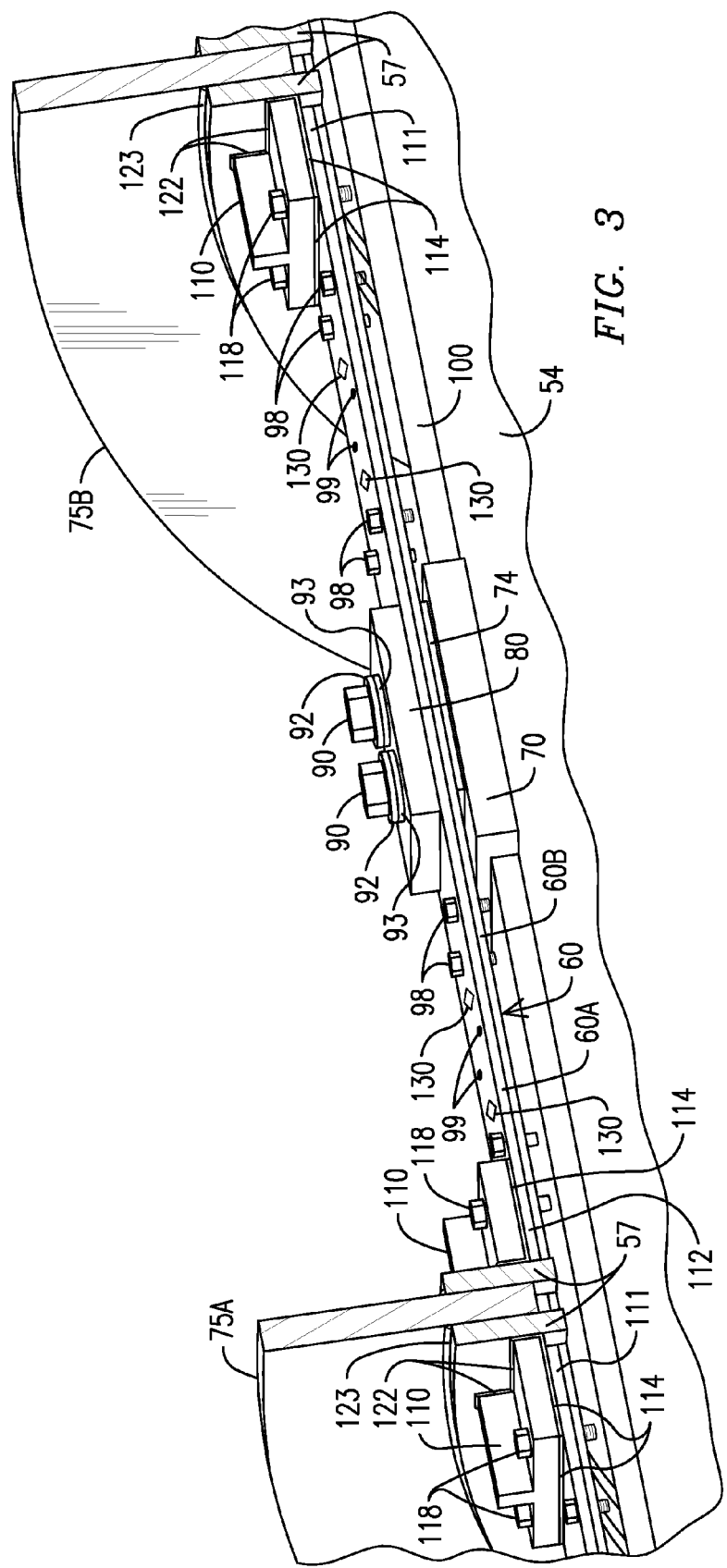
FIG. 3 is a detailed illustration of certain components of FIG. 2.

FIG. 3 illustrates additional details of the core-to-frame attachment components of the present invention.

An inwardly-facing surface of a key bracket or key block 70 is disposed in contact with a key bar 100. In the illustrated embodiment the key block 70 comprises an inverted U-shaped member that contacts three surfaces of the key bar 100.

In one embodiment the key bar 100 exhibits a dovetail shape that is geometrically captured within a corresponding axial groove in the core 54, such as is illustrated in FIG. 1.

The following components extend radially outwardly from the key block 70: a rectangular friction member or friction washer 74, a laminated spring bar 60 further comprising spring bar components 60A and 60B, and a load bearing plate 80. The spring bar components 60A and 60B are similarly shaped and in surface-to-surface contact.

These identified components are removably coupled by bolts 90, mating washers 92 and load-indicating washers 93. The bolts 90 extend through each of the components and are threadably received in threaded holes in the key bar 100. The load indicator washers 93 comprise projections on at least one surface thereof that are deformed or crushed into a flat shape when a desired torque is applied to the bolts 90.

In other embodiments more than the two illustrated bolts 90 and washers 92 and 93 may be used to couple these components.

Coupling the key block 70 to the spring bar 60 transmits the core forces (weight and forces developed during operation) from the core to the spring bar then to the frame rings and finally to the generator frame.

Top and bottom surfaces of the friction member 74 are formed to provide a desired frictional force (e.g., having a desired coefficient of friction when used between the laminated spring bar 60 and the key block 70) to maintain the torque applied by the bolts 90.

Figure 4:
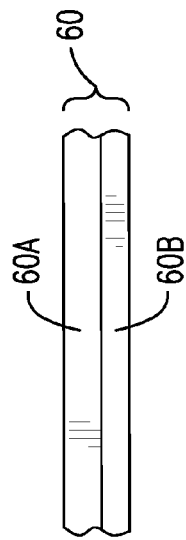
FIG. 4 is a detailed illustration of certain components of FIG. 3.

In the illustrated embodiment of FIGS. 3 and 4 the spring bar 60 comprises two laminated spring bar subcomponents 60A and 60B placed in aligned contact to form the spring bar 60. Other embodiments may comprise more or fewer than two laminated spring bar subcomponents forming the spring bar 60. However in certain applications it may be difficult to use a single spring bar in place of the two laminated spring bars 60A and 60B when these components are installed in-situ in an existing generator.

A spring bar span is generally defined as an axial distance between two consecutive frame rings 75A and 75B. The inventors have determined that shortening the span stiffens the spring bar and modifies the natural frequency of the core-to-frame attachment components.

A plurality of bolts 98 is disposed along a span to couple spring bar subcomponents 60A and 60B. The FIG. 3 embodiment illustrates four bolts between the frame ring 75A and the load bearing plate 80 and four bolts between the frame ring 75B and the load bearing plate 80. Other embodiments may have more or fewer than the illustrated number of bolts.

Each bolt 98 passes through the spring bar subcomponents 60A and 60B and threadably engages a mating nut hidden from view in FIG. 3. In one embodiment each of the bolts 98 comprises a shoulder bolt. The inventors have also determined that clamping the spring bar components modifies the natural frequency of the core-to-frame attachment components.

In addition to or in lieu of the bolts 98, the spring bar subcomponents 60A and 60B are attached together by spot weld joints 99. Preferably the spot weld joins 99 are formed by first forming one or more openings through the spring bar subcomponents 60A and 60B then forming a spot weld joint 99 within each opening.

Depending on a natural frequency of the core-to-frame attachment system, certain embodiments may use only the bolts 98, other embodiments may use only the spot welds 99, and still other embodiments may use both the bolts 98 and the spot welds 99.

The coupled interface between the spring bar 60 and the key bar 70 affects the stiffness properties of the core-to-frame attachment system. For example, a longer key block shortens the span and thus provides additional stiffness. The distance between bolts 98 can also be modified to change the span length and the stiffness properties of the system.

An (inverted) T block 110 couples an end 111 of the laminated spring bar 60 to a proximate U-plate 57. An opposing end 112 of the spring bar 60 similarly couples a T-block 110 to a proximate U-plate 57. In the illustrated embodiment weld joints 122 are used as the coupling component.

The U-plates 57 are welded to respective frame rings 75A and 75B at weld joints 123. Since the U-plate is welded to a frame ring, the U-plate is an integral part of the frame ring and the spring bar span may instead be defined as the distance between two consecutive U-plates.

As also illustrated in FIG. 3, the T blocks 110 are welded to the spring bar member 60B at weld joints 114 and also coupled to the spring bar 60 by bolts 118 and mating nuts (the nuts not seen in FIG. 3).

The T blocks 110 are not present in the prior art and the spring bar 60 is instead fixed to each U-plate. Thus the spring bar span is defined as the distance between consecutive U-plates. The present invention adds the T blocks 110 and by welding the T blocks to the U-plates shortens the span to a distance between the T blocks (or more precisely to the distance between the end points of the weld joints that couple the T blocks to the U-plate).

Although the key bars, spring bars and their associated components span an entire axial length of the core, FIG. 3 illustrates a first span and the T block 110 of a second span. Thus according to one embodiment, each span comprises two T blocks 110 (one at each end of the span), one key block 70, one rectangular friction member 74, one load bearing plate 80 and other associated components disposed along the span.

With reference to FIG. 3, each spring bar span further defines two diamond-shaped openings 130, with a variable number of these openings (two illustrated in FIG. 3) on each side of the key block/load bearing plate assembly.

Generally, about fifteen spring bars and associated components are disposed circumferentially around the generator core 54.

The coupling components of the present invention tune the natural frequency of the core support system to a frequency significantly different (a greater frequency in one embodiment) than the resonant frequencies of the generator. This is accomplished by controlling a length of the spans (which in turn controls a distance between the T blocks) and/or employing additional coupling subcomponents (e.g., the bolts 98 and/or the spot welds 99 for attaching the spring bar subcomponents 60A and 60B). For example, shortening the span and/or using additional coupling components to couple the spring bar subcomponents 60A and 60B increases the radial stiffness of the core-to frame attachment system. The weld joints 114 and 122 of FIG. 3 are also important load-carrying members.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A generator comprising:
   a generator frame;
   first and second frame rings extending radially inwardly from an inside surface of the generator frame;
   a stator core within the generator frame;
   key bars spaced apart circumferentially and each extending axially along and coupled to the stator core;
   laminated spring bars spaced apart circumferentially and each extending axially along the stator core, each spring bar comprising a first spring bar end supported by the first frame ring and a second opposing spring bar end supported by the second frame ring, the each spring bar coupled to each key bar;
   wherein the each spring bar further comprises a plurality of spring bar subcomponents; and
   a plurality of couplers for coupling the plurality of spring bar subcomponents,
   wherein the plurality of couplers comprise:
   a first T block coupled to the first spring bar end at a first weld joint;
   the first T block coupled to a first U plate at a second weld joint;
   the first U plate coupled to the first frame ring at a third weld joint;
   a second T block coupled to the second spring bar end at a fourth weld joint;
   the second T block coupled to a second U plate at a fifth weld joint;
   the second U plate coupled to the second frame ring at a sixth weld joint;
   a first bolt and mating nut for coupling the first spring bar end and the first T block; and
   a second bolt and mating nut for coupling the second spring bar end and the second T block.

2. The generator of claim 1 the each spring bar further comprising:
   a key block located between the first and second spring bar ends and in contact with the each key bar;
   a friction member having an inwardly-facing surface in contact with the key block and an outwardly facing surface in contact with the each spring bar;
   a load bearing plate in contact with an outwardly-facing surface of the each spring bar; and
   one or more of the bolts extending through the load bearing plate, the each spring bar, the friction member, and the key block, and threadably engaged with one or more of the mating nuts in the each key bar.

3. The generator of claim 2 wherein the couplers for coupling the plurality of spring bar subcomponents further comprise a first plurality of couplers between the key block and the first spring bar end and a second plurality of couplers between the key block and the second spring bar end.

4. The generator of claim 3 wherein each one of the first and second plurality of couplers comprises a threaded bolt and mating nut.

5. The generator of claim 3 wherein each one of the first and second plurality of couplers comprises four couplers.

6. The generator of claim 3 wherein each one of the first and second plurality of couplers comprises a spot weld formed in an opening in each one of the plurality of spring bar subcomponents.

* * * * *